(12) United States Patent
Uno

(10) Patent No.: US 7,433,583 B2
(45) Date of Patent: Oct. 7, 2008

(54) RECORDING APPARATUS

(75) Inventor: Shinichiro Uno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 728 days.

(21) Appl. No.: 10/848,161

(22) Filed: May 19, 2004

(65) Prior Publication Data

US 2004/0240342 A1 Dec. 2, 2004

(30) Foreign Application Priority Data

May 27, 2003 (JP) .............................. 2003-149197

(51) Int. Cl.
*H04N 5/00* (2006.01)
*H04N 5/91* (2006.01)

(52) U.S. Cl. ........................................ 386/125; 386/46

(58) Field of Classification Search ................... 386/46, 386/125

See application file for complete search history.

(56) References Cited

U.S. PATENT DOCUMENTS

| | | | | |
|---|---|---|---|---|
| 5,424,850 | A * | 6/1995 | Inoue et al. .................. | 386/100 |
| 6,118,924 | A | 9/2000 | Nakatani et al. ............. | 386/70 |
| 6,285,827 | B1 | 9/2001 | Nakatani et al. ............. | 386/126 |
| 6,353,704 | B1 | 3/2002 | Nakatani et al. ............. | 386/126 |
| 7,068,918 | B1 * | 6/2006 | Chung et al. ................. | 386/95 |
| 2001/0043805 | A1 * | 11/2001 | Nakatani et al. ............. | 386/126 |
| 2002/0106195 | A1 | 8/2002 | Ando et al. .................. | 386/95 |
| 2002/0159382 | A1 * | 10/2002 | Ohata et al. ................. | 369/275.3 |
| 2003/0086688 | A1 | 5/2003 | Saeki et al. .................. | 386/65 |
| 2003/0185542 | A1 * | 10/2003 | McVeigh et al. ............. | 386/46 |
| 2003/0190153 | A1 | 10/2003 | Itoh et al. .................... | 386/96 |
| 2003/0231873 | A1 * | 12/2003 | Hong ........................... | 386/113 |
| 2004/0107223 | A1 | 6/2004 | Uno et al. .................... | 707/200 |

FOREIGN PATENT DOCUMENTS

| | | |
|---|---|---|
| EP | 0 866 456 | 9/1998 |
| EP | 0 971 349 | 1/2002 |
| JP | 11-259992 | 9/1999 |
| JP | 2000-188731 | 7/2000 |
| JP | 2002-109833 | 4/2002 |
| WO | 02/23896 | 3/2002 |

OTHER PUBLICATIONS

Japanese Office Action dated Jan. 29, 2008 in corresponding Japanese Application No. 2003-149197.
English language translation of portion of Japanese Office Action dated Jan. 29, 2008 in corresponding Japanese Patent Application No. 2003-149197.

* cited by examiner

*Primary Examiner*—Marsha D. Banks-Harold
*Assistant Examiner*—Oluwaseun A Adegeye
(74) *Attorney, Agent, or Firm*—Fitzpatrick, Cella Harper & Scinto

(57) ABSTRACT

A recording apparatus for recording moving image data on a disk-like recording medium detects a defective area on the disk-like recording medium, determines a continuous data area for the moving image data on the basis of a data rate of the moving image data to be recorded and the detected defective area, and records the moving image data in accordance with the continuous data area.

14 Claims, 6 Drawing Sheets

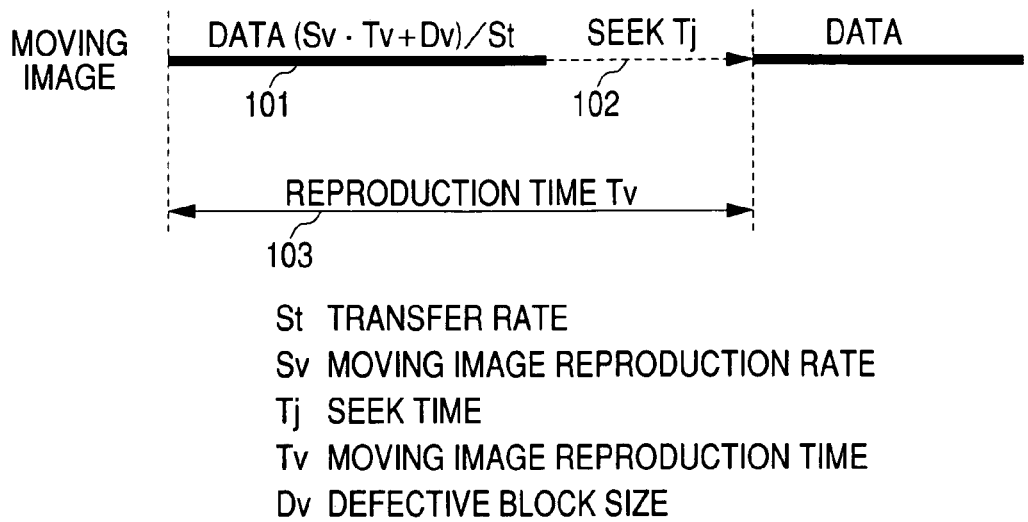
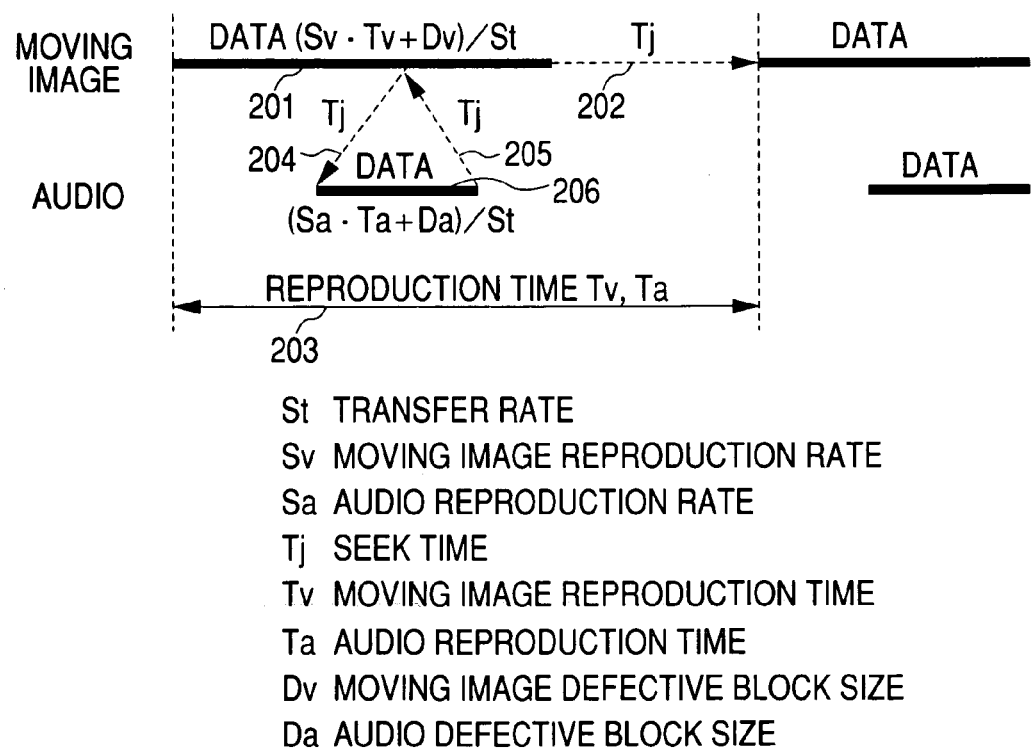

FIG. 4

| | | | |
|---|---|---|---|
| SEEK TIME Tj | 1.0 sec | 1.0 sec | 1.0 sec |
| TRANSFER RATE St | 24 Mbps | 24 Mbps | 24 Mbps |
| MOVING IMAGE REPRODUCTION RATE Sv | 12M bps | 6 Mbps | 12 Mbps |
| MOVING IMAGE DEFECTIVE BLOCK SIZE Dv | 0 Byte | 0 Byte | 300 KBytes |
| MOVING IMAGE MINIMUM RECORDING TIME Tv | 2.0 sec | 1.33 sec | 2.2 sec |
| MOVING IMAGE MINIMUM RECORDING SIZE Lv | 3.0 MB | 1.0 MB | 3.6 MB |

FIG. 5

| | | | |
|---|---|---|---|
| SEEK TIME Tj | 1.0 sec | 1.0 sec | 1.0 sec |
| TRANSFER RATE St | 24 Mbps | 24 Mbps | 24 Mbps |
| MOVING IMAGE REPRODUCTION RATE Sv | 12 Mbps | 6 Mbps | 12 Mbps |
| AUDIO REPRODUCTION RATE Sa | 256 Kbps | 256 Kbps | 256 Kbps |
| MOVING IMAGE DEFECTIVE BLOCK SIZE Dv | 0 Byte | 0 Byte | 920 KBytes |
| AUDIO DEFECTIVE BLOCK SIZE Da | 0 Byte | 0 Byte | 20 KBytes |
| MOVING IMAGE MINIMUM RECORDING TIME Tv | 6.13 sec | 4.06 sec | 6.75 sec |
| AUDIO MINIMUM RECORDING TIME Ta | 6.13 sec | 4.06 sec | 6.75 sec |
| MOVING IMAGE MINIMUM RECORDING SIZE Lv | 9.19 MB | 3.04 MB | 11.0 MB |
| AUDIO MINIMUM RECORDING SIZE La | 196 KB | 130 KB | 236 KB |

FIG. 6

| | | | |
|---|---|---|---|
| SEEK TIME Tj | 1.0 sec | 1.0 sec | 1.0 sec |
| TRANSFER RATE St | 24 Mbps | 24 Mbps | 24 Mbps |
| MOVING IMAGE REPRODUCTION RATE Sv | 12 Mbps | 6 Mbps | 12 Mbps |
| DEFECTIVE BLOCK PERCENTAGE Rd | 0 % | 0 % | 10 % |
| MOVING IMAGE MINIMUM RECORDING TIME Tv | 2.0 sec | 1.33 sec | 2.25 sec |
| MOVING IMAGE MINIMUM RECORDING SIZE Lv | 3.0 MB | 1.0 MB | 3.75 MB |

FIG. 7

| | | | |
|---|---|---|---|
| SEEK TIME Tj | 1.0 sec | 1.0 sec | 1.0 sec |
| TRANSFER RATE St | 24 Mbps | 24 Mbps | 24 Mbps |
| MOVING IMAGE REPRODUCTION RATE Sv | 12 Mbps | 6 Mbps | 12 Mbps |
| AUDIO REPRODUCTION RATE Sa | 256 Kbps | 256 Kbps | 256 Kbps |
| DEFECTIVE BLOCK PERCENTAGE Rd | 0 % | 0 % | 10 % |
| MOVING IMAGE MINIMUM RECORDING TIME Tv | 6.13 sec | 4.06 sec | 6.93 sec |
| AUDIO MINIMUM RECORDING TIME Ta | 6.13 sec | 4.06 sec | 6.93 sec |
| MOVING IMAGE MINIMUM RECORDING SIZE Lv | 9.19 MB | 3.04 MB | 11.6 MB |
| AUDIO MINIMUM RECORDING SIZE La | 196 KB | 130 KB | 246 KB |

RECORDING APPARATUS

BACKGROUND OF THE INVENTION

1. Field of the Invention

The present invention relates to a recording apparatus, and more particularly to an apparatus for recording data on a disk medium.

2. Related Background Art

When moving image data and audio data are recorded on a disk medium, in general, a massive data stream obtained through continuous recording of data is recorded in areas on a disk located separate from each other with the massive data stream being divided into a plurality of parts (extents). In a case of reproducing a moving image and sound, data of which is distributed among a plurality of extents, it takes a time (seek time) that a head moves between the extents in order to reproduce the data. Thus, when the extent is small in size, an operation for reading out data is delayed for an operation for outputting the reproduced data. As a result, the data may not be continuously reproduced in some cases. Then, heretofore, in order to ensure the continuous reproduction, a minimum recording unit (i.e., continuous data area (CDA)) was determined irrespective of a bit rate of a data stream and the number of defective blocks.

However, since even if the data is recorded in any of the defective blocks, such data can not be normally reproduced, during the recording of a moving image data, a processing for skipping a defective block (skip processing) is executed. For this reason, a problem occurs that if the number of defective blocks is increased due to deterioration in quality of disk, then an amount of effective data contained in the CDA is reduced to make the continuous reproduction impossible. Moreover, there is also encountered a problem that since the CDA is determined on the assumption that the bit rate of the data stream is at a maximum, when the bit rate is small, an unnecessarily large recording unit is required.

SUMMARY OF THE INVENTION

It is an object of the present invention to solve the above-mentioned problems.

It is another object of the present invention to enable data to be recorded at an optimal recording unit even when defective blocks are present on a recording medium.

To solve the above-mentioned problems, according to one aspect of the present invention, a recording apparatus includes: recording means for recording moving image data on a disk-like recording medium; detection means for detecting a defective area in the disk-like recording medium, the moving image data recorded in the defective area being unable to be normally reproduced; and control means for determining a continuous data area for the moving image data to be recorded by the recording means, on the basis of a data rate of the moving image data to be recorded by the recording means and the defective area detected by the detection means and controlling the recording means so as to record the moving image data in accordance with the continuous data area.

Other objects other than the above objects and their features will become clear by the following detailed description of preferred embodiments with reference to the accompanying drawings.

BRIEF DESCRIPTION OF THE DRAWINGS

FIG. 1 is a diagram showing a relationship between recorded data and a time for reproduction when moving image data is reproduced;

FIG. 2 is a diagram showing a relationship between recorded data and a time for reproduction when after-recording data is reproduced;

FIG. 4 is a diagram showing examples of calculation of a CDA when the moving image data is reproduced in an embodiment of the present invention;

FIG. 5 is a diagram showing examples of calculation of a CDA when the after-recording data is reproduced in an embodiment of the present invention;

FIG. 6 is a diagram showing examples of calculation of a CDA when the moving image data is reproduced in an embodiment of the present invention; and FIG. 7 is a diagram showing examples of calculation of a CDA when the after-recording data is reproduced in an embodiment of the present invention.

DESCRIPTION OF THE PREFERRED EMBODIMENTS

Figure 3A:
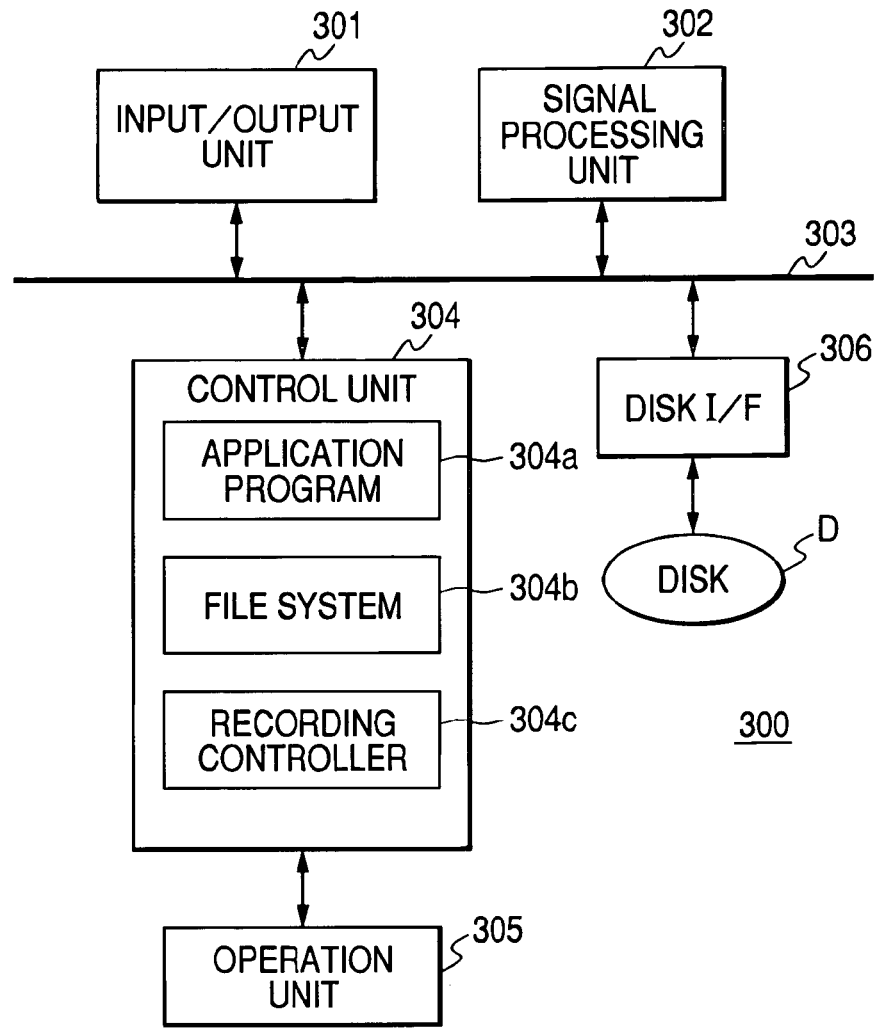
FIGS. 3A and 3B are block diagrams showing a configuration of a recording/reproducing apparatus to which the present invention is applied, and a perspective view showing data recorded on a disk.

Preferred embodiments of the present invention will hereinafter be described in detail with reference to the accompanying drawings. FIG. 3A is a block diagram showing a configuration of a recording/reproducing apparatus 300 to which the present invention is applied. The recording/reproducing apparatus 300 of an embodiment has a function of recording/reproducing moving image on/from a disk medium such as a DVD.

In FIG. 3A, reference numeral 301 denotes an input-output unit for receiving as its input moving image data and audio data from the outside of the recording/reproducing apparatus 300 and for outputting reproduced moving image data to the outside of the apparatus 300. Reference numeral 302 denotes a signal processing unit for encoding moving image data and audio data inputted thereto in accordance with an encoding method such as a moving picture experts group (MPEG) method to compress an information amount of encoded moving image data and audio data and for decoding reproduced moving image data and audio data. Reference numeral 303 denotes a data bus through which data is transmitted between associated units.

Reference numeral 304 denotes a control unit for controlling an operation of the apparatus 300 in accordance with an instruction issued through an operation unit 305. The control unit 304 has an application program 304a, a file system 304b and a recording controller 304c. The application program 304a controls the signal processing unit 302 so as to control a processing for encoding/decoding moving image data, and instructs the file system 304b to carry out recording and reproducing, editing and the like of data on a disk D. The file system 304b checks on a space area on the disk D and a recording position of a file in accordance with an instruction issued from the application program 304a to instruct the recording controller 304c to read out/write data from/to the disk D.

At this time, the application program 304a does not need to check any of the recording positions on the disk D. Thus, the file system 304b searches for a space area on the disk D to record data in the space area, and retrieves a data recording position on the disk D to read out the data from the data recording position.

The recording controller 304c controls a disk I/F 306 so as to record moving image data in a position on the disk D specified by the file system 304b and so as to read out the moving image data from the specified position on the disk D.

The disk I/F 306 has a head carriage or a seek motor for moving an optical pickup or a pickup for recording/reproducing data on/from the disk D, in a radial direction of the disk D, or a spindle motor or the like for rotating the disk D. Thus, the disk I/F 306 records/reproduces the moving image data on/from the disk D in accordance with an instruction issued from the recording controller 304c.

Figure 3B:
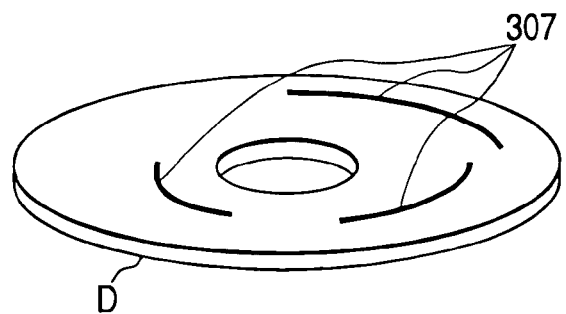

FIG. 3B is a perspective view showing data recorded on the disk D.

Reference numeral 307 denotes data written into the disk D. The data is read out/written from/to the disk D with a recording/reproducing head provided inside the disk I/F 306. In this embodiment, one file including a series of moving image data may be recorded in continuous data areas on the disk D, or may be separately recorded in a plurality of different areas. Then, continuous data areas on the disk D having massive data recorded therein are called extents.

In the recording/reproducing apparatus 300 configured as shown in FIG. 3A, in the normal recording operation, upon reception of an instruction to start the recording issued from the operation unit 305, the application program 304a of the control unit 304 controls the signal processing unit 302 so as to encode the moving image data and the audio data inputted thereto in accordance with the MPEG method. Then, the file system 304b of the control unit 304 instructs the controller 304c to record the encoded moving image data and audio data in a space area on the disk D in accordance with an instruction issued from the application program 304a. The recording controller 304c controls the disk I/F 306 so as to record the MPEG data outputted from the signal processing unit 102 in a specified area on the disk D.

At this time, the file system 304b carries out the control so as to continuously record the MPEG data in an area which is larger than the CDA decided by the application program 304a as will be described later. Note that, in this embodiment, different methods of calculating the CDA are applied respectively when the after-recording data is reproduced and when only the moving image data is reproduced. Hence, in a case where there is a possibility that the after-recording audio data may be added later, before start of the recording, a user starts the recording after selecting an after-recording data reproduction mode. In this state, the recording is continuously carried out until an instruction to stop the recording is issued. In this embodiment, the MPEG data indicating a series of moving images and sound in a period from issuance of an instruction to start the recording to issuance of an instruction to stop the recording, is recorded in the form of one file.

In this embodiment, the disk D can be ejected and inserted by an ejection mechanism (not shown).

Next, a processing during the reproduction will hereinafter be described.

During the reproduction, upon reception of an instruction to reproduce a specified file issued from the operation unit 305, the application program 304a instructs the file system 304b to reproduce the specified file from the disk D. Then, the file system 304b instructs the recording controller 304c to output information of recording addresses on the disk of the specified file and start the reproduction. Then, the recording controller 304c controls the disk I/F 306 so as to reproduce the MPEG data in the specified file from the disk D. The reproduced MPEG data is outputted to the signal processing unit 302 which decodes in turn the reproduced MPEG data inputted thereto to output the decoded data to the input-output unit 301.

In this embodiment, the recording/reproducing apparatus 300 also has a function of recording/reproducing after-recording audio data in addition to such a normal recording/reproducing processing function.

When the after-recording audio data is recorded, a user manipulates the operation unit 305 to set an operation mode to an after-recording data recording mode. Then, he/she selects a file including moving image data to which after-recording audio data is desired to be added and starts the reproduction of the file concerned. Then, after the file is reproduced up to a position where the after-recording audio data is desired to be added, the reproduction is stopped for a time. If in this state, the audio data desired to be added is inputted through the input-output unit 301 and an instruction to start the recording is issued, then the application program 304a, similarly to the case of the normal recording, controls the signal processing unit 302 so as to encode the inputted audio data.

Then, the application program 304a instructs the file system 304b to record the audio data in the form of audio data for after-recording on the disk D. The file system 304b instructs the recording controller 304c to detect a predetermined space area on the disk D and records the after-recording audio data in the predetermined space area. The recording controller 304c controls the disk I/F 306 so as to record audio data sent from the signal processing unit 302 in a specified area on the disk D. Then, upon reception of an instruction to stop the recording issued from the operation unit 305, the audio data indicating a series of sound for a time period from start of the recording to stop of the recording is recorded in the form of one after-recording audio data file. At this time, a CDA of the after-recording audio data is also determined in a manner as will be described later.

In addition, the application program 304a detects information related to an after-recording start position in the original MPEG data, and information related to a reproduction time of the after-recording audio data, and creates management information indicating a procedure for reproducing after-recording data and records the management information on the disk D.

During the after-recording data reproduction, an after-recording reproduction start position in the original MPEG data is detected on the basis of the management information to start the reproduction of the after-recording audio data from the after-recording data reproduction start position.

CAD of Moving Data

FIG. 1 is a diagram showing a relationship between recorded data and a reproduction time when a moving image is singly reproduced. In FIG. 1, reference numeral 101 denotes a time when the head is moved over an area (extent) having data recorded therein, and reference numeral 102 denotes a time for the seek by the head. Reference numeral 103 denotes a time required to reproduce read-out data.

As shown in FIG. 1, the moving image data is recorded on the disk D with the moving image data being distributed among massive areas called the extents. At this time, when the moving image is continuously reproduced across the extents, the seek by the head occurs between the extents. For this reason, in case that a total of the read-out time 101 of the data recorded across from one extent to the next extent (an area surrounded by a dotted line in the figure) and the seek time 102 for next data is shorter than the time 103 required for the data within the extent to be reproduced, the moving image can not be continuously reproduced. Then, a minimum recording area in which the data can be continuously reproduced without a break is called a continuous data area (CDA). Thus, during the recording, the data needs to be recorded in a continuous data area equal to or larger than the CDA.

A method including obtaining the CDA when a moving image is singly reproduced will hereinafter be described with reference to FIG. 1.

Reference numeral 101 in FIG. 1 denotes the time when the data contained in one extent is read out from the disk D. Moving image data for a reproduction time Tv (seconds) is included in the read-out data. The moving image data for the reproduction time Tv has a size of Sv×Tv (bits) since a reproduction data rate is assigned Sv (bps). Here, a defective block from which the moving image data can not be properly reproduced is supposed to be present in the extent. Hence, supposing that a size of the defective block is Dv (bits), the size of the extent is expressed by (Sv×Tv+Dv)(bits).

That is to say, if a data rate is St (bps) when the data is read out from the disk D, then a time when the data within one extent is read out from the disk D is expressed by (Sv×Tv+Dv)/St(seconds). Here, the defective block is skipped in the skip processing.

If a time (seek time) required for the head to reach a next extent is Tj (second), in order to continuously reproduce the moving image without a break, the reading out of the data and the seek by the head must be completed within a time Tv (second) which is reproduction time of the moving image contained in one extent. Finally, Equations 1 to 3 have to be satisfied.

$$Tv \geq Tj + \frac{Sv \times Tv + Dv}{St} \quad (1)$$

Equation 1 is then transformed into Equation 2.

$$\left(1 - \frac{Sv}{St}\right)Tv \geq Tj + \frac{Dv}{St} \quad (2)$$

Thus, the CDA is expressed by Equation 3.

$$Tv \geq \frac{Tj + Dv/St}{1 - Sv/St} \quad (3)$$
$$Lv \geq Sv \times Tv + Dv$$

In Equation 3, Tv represents minimum recording time (second) of the moving image data for which the continuous reproduction is ensured. Lv represents a minimum recording size (bit) of the moving image data for which the continuous reproduction is ensured. In the above description, "second" is adopted as a unit of a time and "bit" is adopted as a unit of a size for simplicity of the description. However, in actuality, any unit may be adopted.

Next, FIG. 4 shows examples in which specific numeric values are substituted for the above equation.

Provided that the seek time Tj=1.0 sec, the transfer rate St=24 Mbps, the moving image reproduction rate Sv=12 Mbps, and the defective block size Dv=0 bit, the following equations are obtained.

$Tv \geq 2.0$ sec $Lv \geq 3.0$ MB

As understood from those equations, when there is no defective block, the moving image has only to be recorded at an extent size of 3.0 MB at the minimum. In the case of carrying out the calculation by changing the condition of the example, when the moving image reproduction rate Sv is 6 Mbps, the following equations are obtained.

$Tv \geq 1.33$ sec $Lv \geq 1.0$ MB

From those equations, it is understood that if the moving image reproduction rate is halved, then the moving image minimum recording time Tv is reduced to about ⅔, and the moving image minimum recording size is reduced to about ⅓. Note that this change amount differs depending on the transfer rate and the reproduction rate. In addition, in case that the moving image defective block size Dv is 300 KB (a defective block percentage is about 10%), the following equations are obtained.

$Tv \geq 2.2$ sec $Lv \geq 3.6$ MB

From those equations, it is understood that if the defective block percentage is increased by 10%, then the minimum recording time is increased by about 10%, and the minimum recording size is increased by about 20%.

CDA During Reproduction of After-recording Data

Next, a description will hereinafter be given with respect to a CDA during reproduction of the after-recording data.

In this embodiment, the moving image data and the audio data for after-recording data reproduction are recorded in the form of separate files on the disk D, and the original voice included in the moving image data is, while both the files are alternately read out, replaced with an after-recording audio data to thereby realize the after-recording data reproduction. In addition, the same CDA is applied to a case as well where in addition to the after-recording data, an audio channel included in the moving image data and an audio channel of a different file are synthesized to output the resultant data.

FIG. 2 is a diagram showing a relationship between recorded data and a reproduction time during the reproduction of the after-recording data. In FIG. 2, reference numerals 201 and 206 denote times when the head is moved over an area (extent) having data recorded therein, respectively, and reference numerals 202, 204 and 205 denote times for seek by the head. Reference numeral 203 denotes a time when the read-out data is actually reproduced. As shown in FIG. 2, both the moving image data and the audio data are recorded on the disk D with both the data being distributed among a plurality of extents.

At this time, when the data is continuously reproduced across the extents, the seek by the head occurs between the extents as shown by the seek time 202. In addition, in case of reproduction of the after-recording data, the seek for reading out of the audio data during the reading out of the moving image data also occurs as shown by the seek times 204 and 205.

For this reason, when during a time period from one extent to the next extent (an area surrounded by dotted lines in the figure), a total of the times 201 and 206 when the data recorded in the extents for the moving image and the voice is read out, and the seek time 202 required for the head to seek next data and the seek times 204 and 205 for the after-recording data, is shorter than the data reproduction time 203 within the extent, the after-recording data can not be continuously reproduced. Thus, in a case as well where the after-recording data is read out, the CDA needs to be determined.

A method including obtaining a CDA when the after-recording data is reproduced will hereinafter be described with reference to FIG. 2.

Reference numerals 201 and 206 in FIG. 2 denote the times when the data is read out from each extent in which the moving image data and the audio data are contained. The moving image data for a reproduction time Tv (seconds), and the audio data for a reproduction time Ta (seconds) are respectively contained in the data which is reproduced in those time periods.

Similarly to the above-mentioned case where the moving image is singly reproduced, assuming that a data rate of the moving image data to be reproduced is Sv (bps), a data rate of the audio data to be reproduced is Sa (bps), a size of a defective block within an extent of the moving image data is Dv (bits), a size of a defective block within an extent of the audio data is Da (bits), and a rate at which the data is read out from the disk D is St (bps), then a time when the data within the moving image data extent is read out from the disk D is expressed by (Sv×Tv+Dv)/St (seconds), and a time when the data within the audio data extent is read out from the disk D is expressed by (Sa×Ta+Da)/St (seconds)(the defective block is skipped in the skip processing).

Assuming that a time (seek time) during which the head is moved between the extents is Tj (seconds), in order to continuously reproduce the after-recording data without a break, the reading-out of the data and the seek by the head must be completed within a reproduction time Tv (seconds) of the moving image data contained in one extent and a reproduction time Ta (seconds) of the after-recording audio data corresponding to that moving image data. Finally, Equation 4 has to be satisfied.

$$Tv \geq 3 \times Tj + \frac{Sv \times Tv + Dv}{St} + \frac{Sa \times Ta + Da}{St} \quad (4)$$

$$Ta \geq 3 \times Tj + \frac{Sa \times Ta + Da}{St} + \frac{Sv \times Tv + Dv}{St}$$

Equation 4 is then transformed into Equation 5

$$\left(1 - \frac{Sv}{St} - \frac{Sa}{St}\right)Tv \geq 3 \times Tj + \frac{Dv}{St} + \frac{Da}{St} \quad (5)$$

$$\left(1 - \frac{Sa}{St} - \frac{Sv}{St}\right)Ta \geq 3 \times Tj + \frac{Da}{St} + \frac{Dv}{St}$$

(minimum values of Tr and Ta are equal to each other). Thus, the CDA is expressed by Equation 6.

$$Tv \geq \frac{3 \times Tj + Dv/St + Da/St}{1 - Sv/St - Sa/St} \quad (6)$$

$$Ta \geq \frac{3 \times Tj + Da/St + Dv/St}{1 - Sv/St - Sa/St}$$

$$Lv \geq Sv \times Tv + Dv$$

$$La \geq Sa \times Ta + Da \quad (6)$$

In Equation 6, Tv and Ta are minimum recording time (second) of the moving image data and the after-recording audio data for which the continuous reproduction is ensured, respectively. Lv and La are minimum recording sizes (bits) of the moving image data and the after-recording audio data for which the continuous reproduction is ensured, respectively. As apparent from Equation 6 as well, minimum values of Tv and Ta are equal to each other. In this case as well, in the description, "second" is adopted as a unit of a time and "bit" is adopted as a unit of a size for simplicity of the description. However, in actual, any unit may be adopted.

Next, FIG. 5 shows examples in which specific numeric values are substituted for Equation 6.

In case that the seek time Tj=1.0 sec, the transfer rate St=24 Mbps, the moving image reproduction rate Sv=12 Mbps, the audio reproduction rate Sa=256 Kbps, and the defective block size Dv=Da=0 bit, the following equations are obtained.

$Tv \geq 6.13$ sec $Ta \geq 6.13$ sec $Lv \geq 9.19$ MB $La \geq 196$ KB

From those equations, it is understood that when there is no defective block, the moving image has to be recorded at an extent size of 9.19 MB at the minimum, and also the voice has to be recorded at an extent size of 196 KB at the minimum. Carrying out the calculation by changing the condition from that example, in case that the data rate Sv of the reproduced moving image data is 6 Mbps, the following equations are obtained.

$Tv \geq 4.06$ sec $Ta \geq 4.06$ sec $Lv \geq 3.04$ MB $La \geq 130$ KB

From those equations, similarly to the case where the moving image is singly reproduced, it is understood that if the moving image reproduction rate is halved, then the minimum recording times Tv and Ta are reduced to about ⅔, and the moving image minimum recording size Lv is reduced to about ⅓. Also, the audio minimum recording size is reduced to about ⅔ since each rate is not changed. Note that this change amount differs depending on the transfer rate and the reproduction rate. In addition, in case that the moving image defective size Dv and the audio defective block size Da are 920 KB and 20 KB (a defective block percentage is about 10%), respectively, the following equations are obtained.

$Tv \geq 6.75$ sec $Ta \geq 6.75$ sec $Lv \geq 11.0$ MB $La \geq 236$ KB

From those equations, similarly to the case where the moving image is singly reproduced, it is understood that if the defective block percentage is increased by 10%, then the minimum recording times Tv and Ta are increased by about 10%, and the minimum recording sizes Lv and La are increased by 20%.

Actual Data Recording Size

In the actual apparatus, the maximum seek time Tj and the rate St at which the data is read out from the disk D are fixed. Then, when the data is actually recorded, the CDA size is determined on the basis of the moving image reproduction rate and the audio reproduction rate, and the moving image defective block size and the audio defective block size. In the usual way, in consideration of the worst case, the CDA size is determined in advance irrespective of the reproduction rates and the defective block sizes.

In this case, however, when the moving image reproduction rate is small, there is required a larger recording area than is needed. Also, if the number of defective blocks becomes equal to or larger than the supposed number, then there arises a possibility that the recording area does not meet the necessary size.

Thus, in this embodiment, as shown in FIGS. 4 and 5, in consideration of the data rates of the moving image data and the audio data, and the sizes of the defective blocks on the disk D during the recording of the moving image data and the after-recording audio data, the CDA size is dynamically determined in order to record the moving image data on the disk D.

More specifically, the application program 304a firstly detects the information on the defective blocks recorded in a predetermined track of the disk D before start of the recording, e.g., when turning ON a power supply of the apparatus. Information on a position (address) of a sector which appears as a defective block from which the data can not be properly reproduced on the disk D is recorded in the defective block information. Thus, this defective block information is detected, whereby it becomes possible to detect a size of the defective block existing in an area on the disk D on which the moving image data is recorded from now on.

In addition, in this embodiment, a user can arbitrarily set a compression rate (data rate) of the moving image data encoded in the signal processing unit 302 by manipulating the operation unit 305. The application program 304a determines, as described above, the CDA size on the basis of the information on the data rate of the moving image data set by a user, and the information on the size of the defective block detected from the disk D.

Then, upon reception of an instruction to start the recording issued from the operation unit 305, the units are controlled so as to record the moving image data on the disk D in accordance with the CDA size determined in such a manner.

In addition, whenever the compression rate of the moving image data is changed by a user, or whenever a new disk D is inserted by a user, the application program 304a calculates and determines the CDA size in a manner as described above.

In such a manner, according to this embodiment, when the moving image data is recorded on the disk D, an optimal continuous data area (CDA) can be always determined to record the moving image data without requiring a larger recording area than is needed, or without recording the moving image data in an area not meeting a necessary size at which the continuous reproduction can be carried out when the moving image data is recorded on the disk D. Note that since the reproduction rate for the after-recording audio data is normally fixed, and even if the rate is changed, it is sufficiently small as compared with the reproduction rate for the moving image, an influence exerted on a change of the CDA may be ignored.

Next, a second embodiment of the present invention will hereinafter be described.

The first embodiment is constituted so that the CDA is dynamically changed in accordance with the data rates of the recorded moving image data and audio data, and the defective block sizes of the disk D.

However, this embodiment is constituted so that the CDA is dynamically changed in correspondence to the data rates of the moving image data and the audio data, and a defective block percentage of the disk D.

As described with reference to FIG. 1, in case that the moving image data is reproduced, in order to continuously reproduce the moving image without a break, in consideration of a time (seek time) T required for the head to reach a next extent from a certain extent, the operation for reading out the data from the disk D and the seeking operation by the head must be completed within a reproduction time of the moving image contained in one extent. Hence, it is necessary to meet the relationship expressed by Equation 1.

While considering a percentage of defective blocks per unit area, i.e., a defective block percentage Rd in Equation 1, the defective block percentage Rd is expressed by Dv/(Sv×Tv+Dv). Hence, the size of the defective block within the extent is expressed by Equation 7.

$$Dv = \left(\frac{Rd}{1-Rd}\right) Sv \times Tv \quad (7)$$

When Equation 7 is substituted for Equation 1, Equation 8 is obtained.

$$Tv \geq Tj + \frac{Sv \times Tv}{(1-Rd)St} \quad (8)$$

Equation 8 is then transformed into Equation 9.

$$\left(\frac{1-Rd-Sv/St}{1-Rd}\right) Tv \geq Tj \quad (9)$$

Thus, the CDA is expressed by Equation 10.

$$Tv \geq \frac{(1-Rd)Tj}{1-Rd-Sv/St} \quad (10)$$

$$Lv \geq \frac{Sv \times Tv}{1-Rd}$$

CDA when After-recording Data is Reproduced.

In Equation 10, Tv represents minimum recording time (second) of moving image data for which the continuous reproduction is ensured. Lv represents a minimum recording size (bit) of the moving image data for which the continuous reproduction is ensured. In this case, "second" is adopted as a unit of a time and "bit" is adopted as a unit of a size for simplicity of the description. However, in actuality, any unit may be adopted.

Next, FIG. 6 shows examples in which specific numeric values are substituted for the above equation.

In case that the seek time Tj=1.0 sec, the transfer rate St=24 Mbps, the moving image reproduction rate Sv=12 Mbps, and the defective block percentage Rd=0, the following equations are obtained.

Tv≧2.0 sec

Lv≧3.0 MB

As understood from those equations, when there is no defective block under the above conditions, the moving image has only to be recorded at an extent size of 3.0 MB at the minimum. In the case of carrying out the calculation by changing the condition of the example, when the moving image data rate Sv is 6 Mbps, the following equations are obtained.

Tv≧1.33 sec

Lv≧1.0 MB

From those equations, it is understood that if the moving image reproduction rate is halved, then the minimum recording time is reduced to about ⅔, and the moving image minimum recording size is reduced to about ⅓. Note that this change amount differs depending on the transfer rate and the reproduction rate. In addition, when the defective block percentage Rd is about 10%, the following equations are obtained.

Tv≧2.25 sec

Lv≧3.75 MB

From those equations, it is understood that if the defective block percentage is increased by 10%, then the minimum recording time is increased by 12.5%, and the minimum recording size is increased by 25%.

CDA in Reproduction of After-Recording

Next, a description will hereinafter be given with respect to the CDA when the after-recording data is reproduced.

As described with reference to FIG. 2, when the moving image data and the after-recording audio data associated with the moving image data are reproduced, giving consideration to the time (seek time) required for the head to move over extents, i.e., to move from a certain extent to a next extent, in order to continuously reproduce the after-recording data without a break, the operation for reading out the moving image data and the audio data from the disk D and the seeking operation by the head must be completed within the reproduction time Tv (seconds) of the moving image data included in each extent and the reproduction time Ta (seconds) of the audio data included in each extent. Hence, it is necessary to meet the relationship expressed by Equation 4.

Hence, the defective block percentage (the percentage of the defective blocks per unit area) Rd is expressed by Rd=Dv/(Sv×Tv+Dv)=Da/(Sa×Ta+Da). Hence, the sizes Dv and Da of the defective blocks within the extent are expressed as follows.

$$Dv = \left(\frac{Rd}{1-Rd}\right) Sv \times Tv \qquad (11)$$

$$Da = \left(\frac{Rd}{1-Rd}\right) Sa \times Ta$$

When Equation 11 is substituted for Equation 4, Equation 12 is obtained.

$$Tv \geq 3 \times Tj + \frac{Sv \times Tv}{(1-Rd)St} + \frac{Sa \times Ta}{(1-Rd)St} \qquad (12)$$

$$Ta \geq 3 \times Tj + \frac{Sa \times Ta}{(1-Rd)St} + \frac{Sv \times Tv}{(1-Rd)St}$$

Equation 12 is then transformed into Equation 13 (minimum values of Tv and Ta are equal to each other).

$$\left(\frac{1-Rd-Sv/St-Sa/St}{1-Rd}\right)Tv \geq 3 \times Tj \qquad (13)$$

$$\left(\frac{1-Rd-Sa/St-Sv/St}{1-Rd}\right)Ta \geq 3 \times Tj$$

Thus, the CDA is expressed as follows.

$$Tv \geq \frac{3 \times (1-Rd)Tj}{1-Rd-Sv/St-Sa/St} \qquad (14)$$

$$Ta \geq \frac{3 \times (1-Rd)Tj}{1-Rd-Sa/St-Sv/St}$$

$$Lv \geq \frac{Sv \times Tv}{1-Rd}$$

$$La \geq \frac{Sa \times Ta}{1-Rd}$$

In Equation 14, Tv and Ta represent minimum recording time (second) of the moving image data and the after-recording audio data for which the continuous reproduction is ensured, respectively. Lv and La represent minimum recording sizes (bits) of the moving image data and the after-recording audio data for which the continuous reproduction is ensured, respectively. As apparent from the above equation, minimum values of Tv and Ta are equal to each other. In this case as well, in the description, "second" is adopted as a unit of a time and "bit" is adopted as a unit of a size for simplicity of the description. However, in actuality, any unit may be adopted.

Next, FIG. 7 shows examples in which specific numeric values are substituted for the above equation. A description is given by using the same data as that of the first embodiment for easy comparison with the first embodiment. In case that the seek time Tj=1.0 sec, the transfer rate St=24 Mbps, the moving image reproduction rate Sv=12 Mbps, the audio reproduction rate Sa=256 Kbps, and the defective block percentage Rd=0, the following equations are obtained.

Tv≧6.13 sec

Ta≧6.13 sec

Lv≧9.19 MB

La≧196 KB

As understood from those equations, when there is no defective block under the above conditions, the moving image has only to be recorded at an extent size of 9.19 MB at the minimum, and also the audio recording has only to be performed at an extent size of 196 KB at the minimum. In the case of carrying out the calculation by changing the condition of the example, in case that the moving image reproduction rate Sv is 6 Mbps, the following equations are obtained.

$Tv \geq 4.06$ sec $Ta \geq 4.06$ sec $Lv \geq 3.04$ MB $La \geq 130$ KB

From those equations, similarly to the case where the moving image is singly reproduced, it is understood that if the moving image reproduction rate is halved, then the minimum recording time is reduced to about ⅔, and the moving image minimum recording size is reduced to about ⅓. Also, the audio minimum recording size is reduced to about ⅔ since each rate is not changed. Note that this change amount differs depending on the transfer rate and the reproduction rate. In addition, in case that the defective block percentage Rd is about 10%, the following equations are obtained.

$Tv \geq 6.93$ sec $Ta \geq 6.93$ sec $Lv \geq 11.6$ MB $La \geq 246$ KB

From those equations, it is understood that if the defective block percentage is increased by 10%, then the minimum recording time is increased by about 13%, and the minimum recording size is increased by 26%.

Actual Data Recording Size

In the actual apparatus, the maximum seek time Tj and the rate St at which the data is read out from the disk D are fixed. Then, when the data is actually recorded, the CDA size is determined on the basis of the moving image data reproduction rate and the audio data reproduction rate, and the defective block percentage. In general, in consideration of the worst case, the CDA size is determined in advance irrespective of the reproduction rates and the defective block percentage.

In this case, however, when the moving image reproduction rate is small, there is required a larger recording area than is needed. Also, if the number of defective blocks becomes equal to or larger than the supposed number of defective blocks, then there arises a possibility that the recording area does not meet the necessary size.

Thus, in this embodiment, as shown in FIGS. 6 and 7, in consideration of the data rates of the moving image data and the audio data, and the defective block percentage of the disk the CDA size is dynamically determined D during the recording of the moving image data and the after-recording audio data in order to record the moving image data on the disk D.

More specifically, the application program 304a firstly detects the information on the defective blocks recorded in a predetermined track of the disk D while reproducing it with the disk I/F 306 before the recording, e.g., when turning ON power supply of the apparatus. In this embodiment, the information on the defective blocks includes information on the defective block percentage that corresponds to a proportion of the defective blocks to the entire recording area of the disk D, and detection of this defective block information makes it possible to detect a percentage of the defective blocks existing in an area on the disk D on which the moving image data is recorded from now on.

In addition, in this embodiment, a user can arbitrarily set a compression rate (data rate) of the moving image data encoded in the signal processing unit 302 by manipulating the operation unit 305. The application program 304a, as described above, determines the CDA size on the basis of the information on the data rate of the moving image data set by a user, and the information on the defective block percentage detected from the disk D.

Then, upon reception of an instruction to start the recording issued from the operation unit 305, each unit is controlled so as to record the moving image data on the disk D in accordance with the CDA size determined in such a manner.

In addition, the application program 304a, whenever the compression rate of the moving image data is changed by a user, or whenever a new disk D is inserted by a user, calculates and determines the CDA size in a, manner as described above.

In this way, according to this embodiment, when the moving image data is recorded on the disk D, an optimal continuous data area (CDA) can be determined to record the moving image data all the time without requiring a larger recording area than is needed, or without recording the moving image data on an area not meeting a necessary size at which the continuous reproduction can be carried out when the moving image data is recorded on the disk D. Note that the reproduction rate for the after-recording audio data is normally fixed, and even if it is changed, it is sufficiently small as compared with the reproduction rate for the moving image, so that an influence exerted on a change of the CDA may be ignored.

In addition, in this embodiment, the defective block percentage is detected on the basis of the defective block information read out from the disk D. However, the defective block percentage is generally determined in correspondence to a kind of disk in some cases. In such cases, the defective block percentage may be determined on the basis of detection of a kind of disk.

The following embodiment is also included in the aspect of the present invention. That is, in order that various devices may be operated for implementing the functions of the embodiments described above, the program codes of the software for implementing the functions of the embodiments described above are supplied to an apparatus or a computer in a system which are connected to the various devices, and the various devices are operated to implement the functions in accordance with the program stored in the computer (a CPU or a micro processing unit (MPU) of the system or the apparatus.

Moreover, in this case, the program codes of the software themselves implement the functions of the embodiments described above, and then the program codes constitute the present invention. As a transmission medium of the program codes, a communication media (wired lines such as optical fiber lines and wireless lines) in a computer network (a local area network (LAN), a wide area network (WAN) such as the Internet, a wireless communication network and the like) for supplying program information by propagating the program information as a carrier wave can be used.

Furthermore, means for supplying the program codes to a computer, such as a recording medium storing the program codes, constitutes the present invention. As the recording medium storing the program codes, for example, a flexible disk, a hard disk, an optical disk, a magneto-optical disk, a compact disk read-only memory (CD-ROM), a magnetic tape, a nonvolatile memory card, a ROM, and the like can be used.

Moreover, not only in the case where the functions of the embodiments described above are implemented by the execution of the supplied program codes by the computer, but also in the case where the functions of the embodiments described above are implemented by the cooperation of the program codes with the operating system (OS) working on the computer or the other application software and the like, it is needless to say that such program codes are included in the embodiments of the present invention.

Moreover, it is needless to say that the following case is also included in the present invention. That is, after the supplied program codes have been stored in a function enhancement board of the computer or a function enhancement unit connected to the computer, a CPU or the like which is installed on the function enhancement board or on the function enhancement unit executes a part of the actual processing, and the functions of the embodiments described above is implemented by the processing.

Incidentally, any of the shapes and structures of the respective portions shown in the embodiments described above shows only an example for embodying the present invention, and the aspect and the sprit of the present invention should not be interpreted to be limited to those shapes and structures. That is, the present invention can be implemented in various shapes without departing from the sprit or the subject matter of the present invention.

The present invention is not limited to the embodiments described above, and various modifications can be done within the sphere of the following claims.

What is claimed is:

1. A recording apparatus comprising:
   recording and reproducing means for recording and reproducing on and from a disk-like recording medium a moving image data file including moving image data, audio data relating to the moving image data, and after-recording audio data to be reproduced in parallel to the moving image data instead of the audio data relating to the moving image data;
   detection means for detecting a defective area in the disk-like recording medium in accordance with defective area information recorded on the disk-like recording medium, wherein the moving image data recorded in the defective area is unable to be normally reproduced; and
   control means for determining minimum sizes of continuous data areas for the moving image data file and the after-recording audio data on the basis of a data rate of the moving image data to be recorded by the recording means, a data rate of the after-recording audio data, and the defective area detected by the detection means, and controlling the recording and reproducing means so as to record the moving image data file and the after-recording audio data in accordance with the minimum continuous data area sizes,
   wherein the recording and reproducing means includes a head for recording data on the disk-like recording medium, and seeking means for seeking a position on the disk-like recording medium in which the data is to be reproduced by the head, and assuming that a seek time of the head is Tj, a rate at which data is read out from the disk-like recording medium is St, the data rate of the moving image data is Sv, the data rate of the after-recording audio data is Sa, a size of a defective area contained in the continuous data area for the moving image data is Dv, and a size of a defective area contained in the continuous data area for the after-recording audio data is Da, then a minimum recording time Tv of the moving image data, a minimum recording time Ta of the after-recording audio data, a minimum recording size Lv of the moving image data, and a minimum recording size La of the after-recording data are expressed as follows:

$$Tv = \frac{3 \times Tj + Dv/St + Da/St}{1 - Sv/St - Sa/St}$$

$$Ta = \frac{3 \times Tj + Da/St + Dv/St}{1 - Sv/St - Sa/St}$$

$$Lv = Sv \times Tv + Dv$$

$$La = Sa \times Ta + Da.$$

2. An apparatus according to claim 1, wherein the defective area information represents the defective area in the disk-like recording medium.

3. An apparatus according to claim 2, wherein the recording and reproducing means reproduces the moving image data and the defective area information from the disk-like recording medium.

4. An apparatus according to claim 2, wherein the detection means detects the defective area in response to new attachment of the disk-like recording medium.

5. An apparatus according to claim 1, further comprising compression means for compressing an information amount of the moving image data to change the data rate of the moving image data.

6. An apparatus according to claim 5, further comprising setting means for arbitrarily setting the data rate of the moving image data, wherein the compression means compresses the moving image data in accordance with the data rate set by the setting means.

7. An apparatus according to claim 1, wherein the control means further creates management information indicating a procedure for reproducing the moving image data and the after-recording audio data and controls the recording and reproducing means so as to record the management information on the disk-like recording medium.

8. A recording apparatus comprising:
   recording and reproducing means for recording and reproducing on and from a disk-like recording medium a moving image data file including moving image data, audio data relating to the moving image data, and after-recording audio data to be reproduced in parallel to the moving image data instead of the audio data relating to the moving image data;
   detection means for detecting a defective area percentage of the disk-like recording medium in accordance with a defective area information recorded on the disk-like recording medium, wherein the moving image data recorded in the defective area is unable to be normally reproduced; and
   control means for determining minimum sizes of continuous data areas for the moving image data file and the after-recording audio data on the basis of a data rate of the moving image data to be recorded by the recording means, a data rate of the after-recording audio data, and the defective area percentage detected by the detection means, and controlling the recording and reproducing means so as to record the moving image data file and the after-recording audio data in accordance with the minimum continuous data area sizes,
   wherein the recording and reproducing means includes a head for recording data on the disk-like recording medium, and seeking means for seeking a position on the disk-like recording medium in which the data is to be reproduced by the head, and assuming that a seek time of the head is Ti, a rate at which data is read out from the disk-like recording medium is St, the data rate of the moving image data is Sv, the data rate of the after-recording audio data is Sa, and the defective area percentage is Rd, then a minimum recording time Tv of the moving image data, a minimum recording time Ta of the after-recording audio data, a minimum recording size Lv of the moving image data, and a minimum recording size La of the after-recording data are expressed as follows:

$$Tv \geq \frac{3 \times (1-Rd)Tj}{1-Rd-Sv/St-Sa/St}$$

$$Ta \geq \frac{3 \times (1-Rd)Tj}{1-Rd-Sa/St-Sv/St}$$

$$Lv \geq \frac{Sv \times Tv}{1-Rd}$$

$$La \geq \frac{Sa \times Ta}{1-Rd}.$$

9. An apparatus according to claim 8, wherein the defective area information represents the defective area percentage of the disk-like recording medium.

10. An apparatus according to claim 9, wherein the recording and reproducing means reproduces the moving image data and the defective area information from the disk-like recording medium.

11. An apparatus according to claim 9, wherein the detection means detects the defective area percentage in response to new attachment of the disk-like recording medium.

12. An apparatus according to claim 8, further comprising compression means for compressing an information amount of the moving image data to change the data rate of the moving image data.

13. An apparatus according to claim 12, further comprising setting means for arbitrarily setting the data rate of the moving image data, wherein the compression means compresses the moving image data in accordance with the data rate set by the setting means.

14. An apparatus according to claim 8, wherein the control means further creates management information indicating a procedure for reproducing the moving image data and the after-recording audio data and controls the recording and reproducing means so as to record the management information on the disk-like recording medium.

* * * * *